Oct. 25, 1949.　　　L. DUBIN ET AL　　　2,485,577
RATIOMETER
Filed April 17, 1945　　　　　　　　2 Sheets-Sheet 1

INVENTORS
LESTER DUBIN
ERNEST PATAKI

Percy P. Lantz
ATTORNEY

Oct. 25, 1949. L. DUBIN ET AL 2,485,577
RATIOMETER
Filed April 17, 1945 2 Sheets-Sheet 2
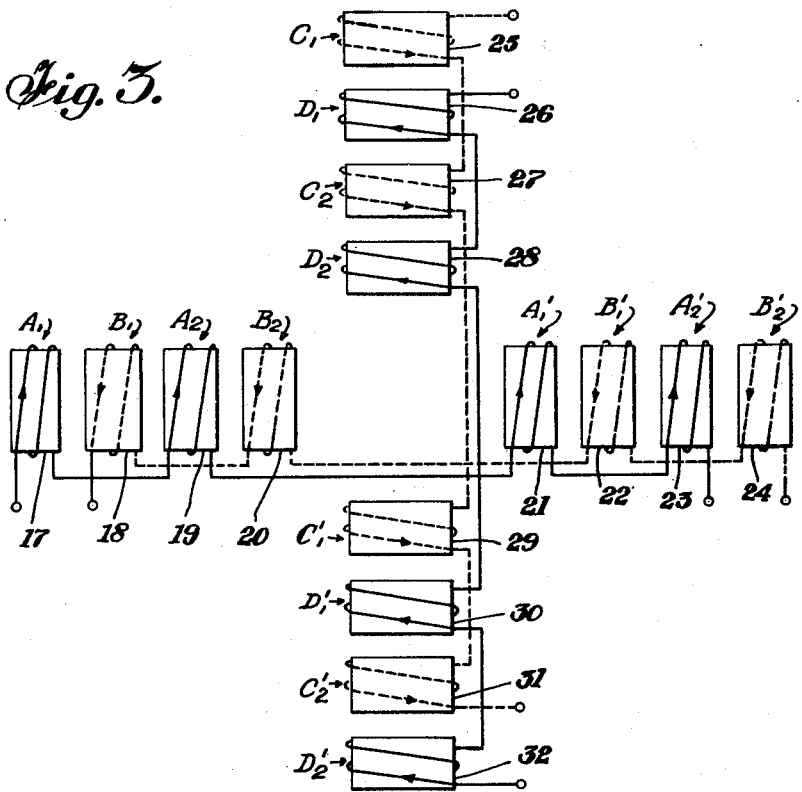
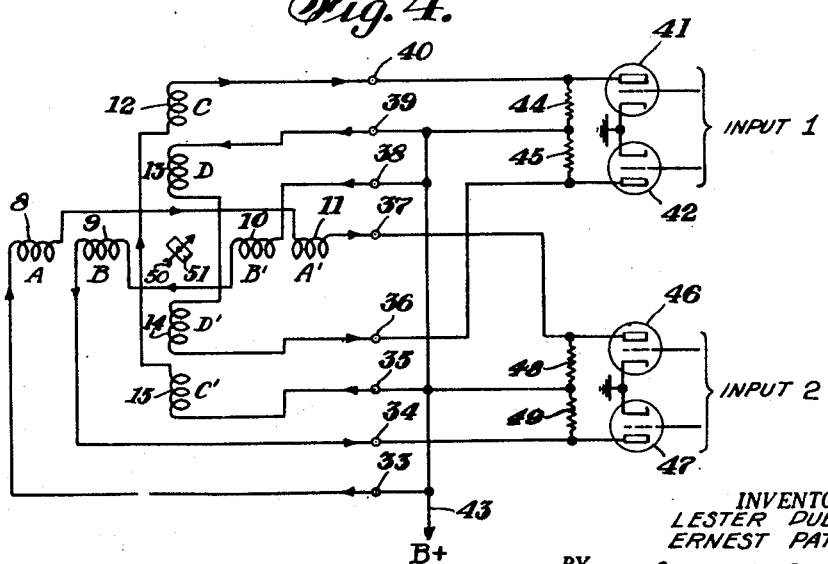
INVENTORS
LESTER DUBIN
ERNEST PATAKI
BY
*Percy P. Lantz*
ATTORNEY Patented Oct. 25, 1949

2,485,577

UNITED STATES PATENT OFFICE 2,485,577

RATIOMETER

Lester Dubin, Brooklyn, and Ernest Pataki, New York, N. Y., assignors to Federal Telephone and Radio Corporation, New York, N. Y., a corporation of Delaware Application April 17, 1945, Serial No. 588,842

6 Claims. (Cl. 171—95)

This invention relates to devices for indicating the ratio of electrical energies by means of a rotatable member and more particularly to ratiometers able to provide indications of energy ratios over a complete 360° or circular swing of the member.

In general, a direct current crossed-coil ratiometer consists of two coils placed at a right or other suitable angle and having a magnet or coil for an indicating member placed at the intersection of the axes of the coils. This indicating member is free to rotate in the plane containing both the coil axes. If uniform magnetic fields are produced about the indicating magnet or coil by each of the two stationary coils, the magnet will align itself with the resulting field and come to rest at an angle $\theta$ with its null position, where $\theta$ equals an angle, the tangent of which is the ratio of the two magnetic fields. A known method of obtaining uniform fields is to utilize the so-called Helmholtz arrangement for each of the coils, that is, each coil is made to comprise two halves disposed along a given axis and equidistantly spaced from and disposed on either side of the intersection of the two main axes. The current in both coil halves is made to flow in the same sense. If $\theta$ is to vary over more than 90°, one and/or the other magnetic field must change direction. In the conventional arrangement discussed hereinabove, this can only be accomplished by changing the direction of one and/or the other current thru the coils. This is not feasible or desirable in all applications.

It is an object of our invention to provide a device for indicating the ratios of electrical quantities over a full circular arc of its indicating member.

It is another object of our invention to provide a crossed-coil ratiometer of the type described wherein the two magnetic fields may be reversed without reversing the direction of any of the activating currents.

It is a further object of our invention to provide a ratiometer wherein the reversal of the resulting fields is accomplished by utilizing the differential resultants of opposing fields.

It is still a further object of our invention to provide a ratiometer wherein the reversal of the magnetic fields is accomplished by means of bifilar windings.

It is still another object to provide a reversal in the fields by means of an opposed Helmholtz or double coil arrangement.

Another object is to provide a reversal of the fields by means of a multiple "pie" coil arrangement of the Helmholtz-coil form.

The essential feature of the present invention is based upon the principle that a coil wound with two wires instead of one, and each supplied with current in the opposite sense to the other, may be made to vary its magnetic field through 0 to a maximum in each direction, without reversing the current in either coil. Each current varies from 0 to maximum, but always unidirectional.

With two such compound coils set with their axis at right angles to each other, the resultant field can be made to rotate through 360° without any reversals of current, thus facilitating the use of vacuum tubes for supplying a ratiometer. The arrangement has the further advantage that since the vacuum tubes can be used, advantage can be taken of amplification to the extent desired or necessary.

In accordance with our invention, we achieve the differential operation of a crossed-coil ratiometer for the purpose of obtaining up to 360° indication in various ways. One such method is the provision of bifilar windings in connection with a Helmholtz or double coil arrangement. In this case each winding carries a current opposite in direction to that in the other winding effecting a subtraction of the two fields. In a second embodiment, each half of the Helmholtz type coils is again halved, the portions on either side of the intersection of the two axes being wound in opposition to the adjacent portions. A third method is an extension of the principle used in the second method. Here, each of the four coil portions of the Helmholtz arrangement is divided into a number of coil parts, alternative coils of each of the portions being connected in series and wound in the same sense.

These and other objects and features of our invention may be better understood from the particular description of certain embodiments thereof made with reference to the accompanying drawings, in which:

Fig. 3 is a schematic view of a third form of the invention; and

Fig. 4 is a schematic diagram of the ratiometer of Fig. 2 connected into an operative circuit.

Figure 1:
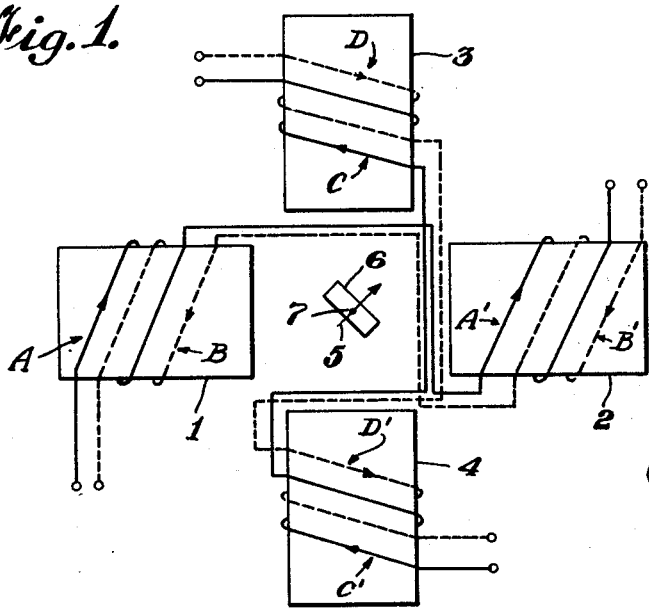
Fig. 1 is a schematic representation of one embodiment of our invention.
Figure 1A:
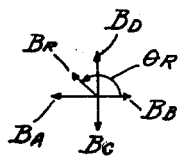
Fig. 1a is a vectorial representation of the field relationships in the ratiometer of Fig. 1.

Referring to Fig. 1 the ratiometer is seen to comprise two crossed-coils consisting of two portions 1, 2, and 3, 4, respectively. An effective pair of superimposed Helmholtz coils is obtained in this case by providing a bifilar winding on the coils 1, 2, 3, 4, referred to as A and A', B and B', C and C', D and D', respectively. The arrows on the respective windings indicate the relative direction therethru of the currents for a given operative condition. At the intersection of the two main axes there is shown an indicator 5 which is mounted on a magnet 6 or the equivalent thereof which is rotatable about an axis through the point of intersection at 7 to align itself in accordance with the resulting field. In the vector diagram Fig. 1a the four intersecting vectorial arrows $B_A$, $B_B$, $B_C$, and $B_D$, represent the relative direction and strength of the four fields due to currents in the windings A—A', B—B', C—C' and D—D', respectively. The vector $B_R$ represents the resultant net field and $\theta_R$ the angle of the field with respect to a zero position which is the angle assumed by the indicator 5.

Figure 2:
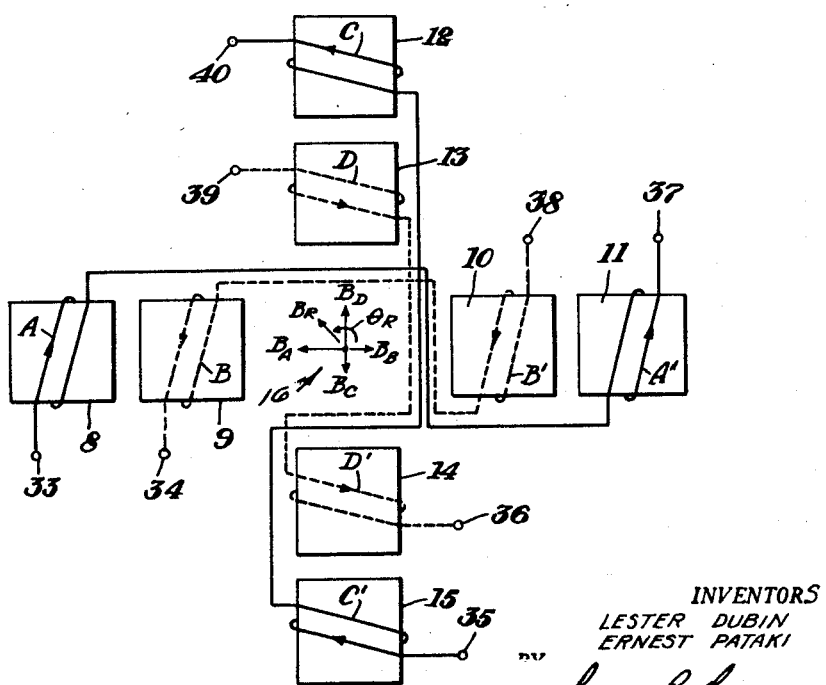
Fig. 2 is a schematic view of another embodiment of the invention.

In Fig. 2 an arrangement is shown where instead of using bifilar windings on one coil, coil portions carrying opposite currents have been provided. Thus coil 1 of Fig. 1 is now shown to comprise the coil portions 8 and 9 which carry currents in opposite directions as indicated by the arrows on the windings. Correspondingly, the bifilar coil 2 of Fig. 1 is now comprised of two portions 10 and 11. Similarly coils 3 and 4 of Fig. 1 now are represented by corresponding coil portions 12 and 13 while the coil 4 of the previous figure corresponds to portions 14 and 15. As will be apparent by inspection, the coil portions 8 and 11, 9 and 10, 12 and 15, and 13 and 14, take the same respective currents. The vectorial diagram 16 at the intersection of the main axes of the coils is similar to that shown in Fig. 1a. The corresponding windings on the coils have been indicated by the same references, that is, A—A', B—B', C—C', D—D', respectively.

In Fig. 3 the original two crossed coils of Fig. 1 are shown arranged in the form of a so-called multiple "pie" construction, which in a sense, is a compromise between the bifilar winding of Fig. 1 and the double coil construction of Fig. 2. Each of the coils 1, 2, 3, 4, of Fig. 1 has been subdivided into four portions 17, 18, 19, 20; 21, 22, 23, 24; 25, 26, 27, 28; and 29, 30, 31, 32. The corresponding windings carrying the same current bear the references $A_1$, $A_2$, $A'_1$, $A'_2$, and analogous references corresponding to the windings B, C, and D of Fig. 1. The construction of Fig. 3 illustrates a double "pie" form comprised of coil portions 17, 19, and 21 and 23 for the common winding $A_1$—$A_2$, $A'_1$—$A'_2$. The number of "pies" however, is limited only by practical considerations and any number of subdivisions or "pies" may be employed.

In Fig. 4 the double coil construction of Fig. 2 is shown connected into a typical operating circuit for indicating the ratios of two electrical quantities. The individual coil portions 8, 9, 10, 11, 12, 13, 14, and 15 have been provided respectively with terminals 33, 34, 35, 36, 37, 38, 39 and 40. One of the two electrical quantities, the ratios of which it is desired to indicate and which is available from the plates of electron discharge tubes 41 and 42 is applied to terminals 36 and 40, that is, to one side of the coils 12 and 14, respectively. The other terminals of the double coil circuit 12—15, 13—14, namely terminals 39 and 35 are connected to a potential source 43 which also serves as the B+ supply for the electron discharge tubes by way of plate resistors 44 and 45. The second electrical quantity is supplied from two further electron discharge tubes 46 and 47. The connections of these latter are analogous to those of the first named or vertical coil assembly, and they are such as to supply a current to the horizontal coil assembly, that is, to coils 8, 11, 9 and 10 over the terminals 37, and 34, respectively. The terminals 38 and 33 are connected to the potential source 43 while resistors 48 and 49 serve to supply a plate potential to the tubes 46 and 47. An indicator 50 is shown mounted on a rotating magnet 51 in order to show the response to the resulting field in terms of degrees of angular position.

In operating the bifilar form of the Helmholtz coils of Fig. 1 the magnetic field intensities at the intersection of the main axes due to the windings A, B, C and D is given by $B_A$, $B_B$, $B_C$ $B_D$, respectively, the various field intensities being each a function of the current through the corresponding winding. Assuming these field intensities have the values as indicated by the corresponding vectors in Fig. 1a, the direction of the respective fields will be as indicated by the arrows due to the currents having the indicated directions in the various windings. The net or resultant field will be substantially of the value represented by the vector $B_R$ forming an angle $\theta_R$ with the horizontal axis which has been chosen as the null position.

$$\theta_R = \arctan\left[\frac{B_D - B_C}{B_B - B_A}\right]$$

It will be seen therefore that the direction and magnitude of the field, for instance, along the X axis, is a function only of the relative opposing magnitudes of the currents through windings A—A', B—B', the direction of these currents remaining unchanged for either direction in the resulting field. A similar effect is produced by the currents through the windings D—D' and C—C' with respect to the Y axis. This arrangement results in a desirable uniformity of field and also in an exact algebraic addition of the opposing field components.

The arrangement of Fig. 2 is somewhat easier to construct than the bifilar form of Fig. 1 but it also yields results closely approximating those obtained with the first described device. However, in order to preserve the advantages inherent in the Helmholtz arrangement for obtaining uniformity of the field at the center, the radius of coil 8 should be larger than that of coil 9 since these coils are not actually superimposed as in the arrangement of Fig. 1. Furthermore, in order to assure that equal currents in the coils produce equal flux densities at the center of the structure, coil 8 should have a larger number of turns than coil 9. The other coil portions are subject to similar considerations. As indicated in the diagram 16 at the center of Fig. 2, the double coil construction for differential operation of the crossed-coil ratiometer does not change the vectorial relationships of the respective fields and the resulting angle.

To minimize the inherent dissymmetry of the coil structure of Fig. 2, the multiple "pie" of Fig. 3 may be employed. Here, too, the idea of differential operation is still retained. In order to achieve the maximum effect of the multiple "pie" construction for producing a uniform field, the "pies" should be individually narrow along the coil axis. Also, a larger number of subdivision or "pies" will make the structure approach in effect the bifilar type of winding. The "pies" may be made identical thus rendering this form advantageous in respect to its ease of manufacture.

The differential operation of a ratiometer of this type, according to one of its uses, depends on the fact that the individual electrical quantities which are to be compared, are each part of functions which are of larger value than the respective quantities. These quantities are then obtainable as the difference between the larger function and the portion by which these functions are larger than the desired quantity. Since the circuit feeding the ratiometer can furnish signals of only one polarity, it becomes necessary to furnish a third signal, so that by subtraction, signals of both polarities may be obtained, and hence, the indicator may be made to move thru 360°. The three signals as received in composite form are the sum of A+sine, A+cosine, and A. They are separated into individual components in the circuit preceding the meter, and the pure sine and cosine terms are derived therefrom by subtracting the term A from the separated duplex functions by applying the voltage proportional to the duplex function to one winding and that proportional to A to the other winding in opposition to the first one.

In the circuit of Fig. 4 the ratio of the electrical quantities which are referred to as input 1 and input 2, respectively may represent any desired indication. In the above named application, an example for the application of this type of ratiometer has been described in connection with the radio beacon art for indicating the direction of travel of an aircraft with respect to a radio beacon which is employing a rotating signal beam. In this application, the ratiometer, by measuring the ratio between two signals varying as a sine and a cosine function respectively, serves to indicate the direction of a receiving aircraft in degrees of angular deviation from a line connecting the aircraft and the transmitter. The ratiometer in such a case is required to indicate over a complete circle of 360°. The ratio indicating device embodying the present invention thus is well suited to provide such a complete circle indication without the necessity for reversing the field producing currents. But the indicating device of our invention is capable of wide application, and is not restricted to the use just described.

While we have described above the principles of our invention in connection with specific apparatus, it is to be clearly understood that this description is made only by way of example and not as a limitation on the scope of our invention as set forth in the objects of our invention and defined in the accompanying claims.

We claim:
1. A device for indicating the ratio of two electrical quantities comprising a first series of coil forming turns, the series consisting of two separate current conductors and on a common magnetic axis each of said turns of said first series being supplied with a current in the opposite sense to the other, a second series of coil forming turns, the second series consisting of two separate conductors and on a second magnetic axis intersecting the first axis at right angles, each of said turns of said second series being supplied with a current in the opposite sense to the other magnetic means suspended at the intersection of the two axes, and means for supplying unidirectional current to each conductor, varied in amplitude in accordance with the ratio to be indicated.

2. A device in accordance with claim 1 wherein each series comprises two halves of a pair of bifilar-wound coils.

3. A device in accordance with claim 1 wherein one of said conductors comprise a pair of coils wound in one sense, and said other conductor comprises a second pair of coils wound in the opposite sense, said first and second pair of coils being arranged to produce a substantially uniform field.

4. A device in accordance with claim 1 wherein one of said conductors comprises a pair of coils wound in one sense and disposed at the extreme opposite ends of their axes, and said other conductor comprises a second pair of coils wound in the opposite sense and disposed between said first pair, said outside coils having a radius and a number of turns at least as large as those of said inside coils.

5. A device in accordance with claim 1 wherein said conductors each comprise an even number greater than two of interconnected coil portions arranged in two sets, one set each disposed to one side of center of the respective axes, portions of said two respective conductors being alternately disposed with respect to one another and being wound in the opposite senses.

6. A device in accordance with claim 1 wherein said magnetic means includes an indicator.

LESTER DUBIN.
ERNEST PATAKI.

REFERENCES CITED

The following references are of record in the file of this patent:

UNITED STATES PATENTS

| Number | Name | Date |
| --- | --- | --- |
| 1,161,819 | Grob | Nov. 23, 1915 |
| 1,677,378 | Albrecht | July 17, 1928 |
| 1,713,850 | McCoy | May 21, 1929 |
| 1,948,912 | Geyger | Feb. 22, 1934 |
| 2,098,029 | Dallmann | Nov. 2, 1937 |
| 2,156,055 | Holsten | Apr. 25, 1939 |
| 2,354,555 | Sias | July 25, 1944 |
| 2,358,910 | De Giers | Sept. 26, 1944 |